June 2, 1931.  J. T. LITTLETON, JR., ET AL  1,808,047
METHOD OF MAKING BEARINGS
Filed Oct. 15, 1928
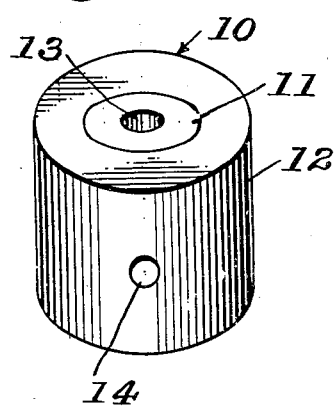
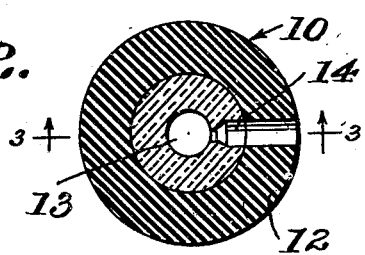
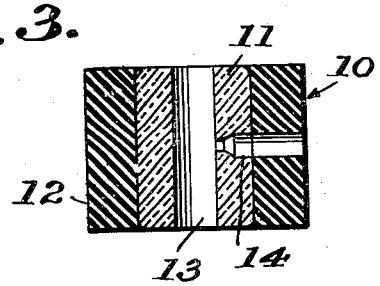
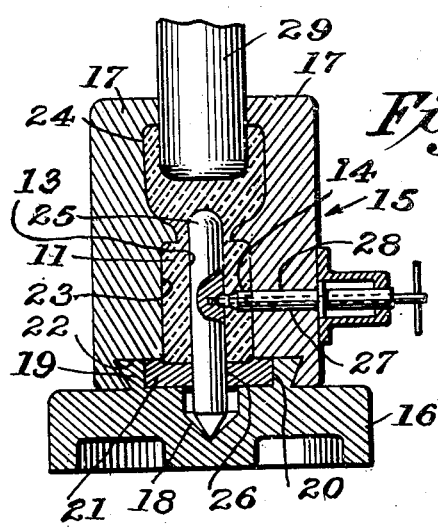
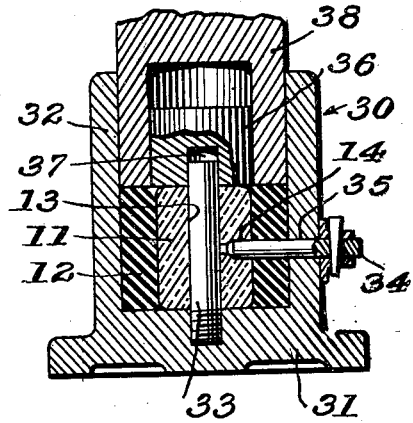
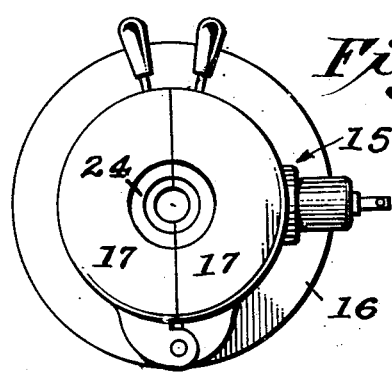
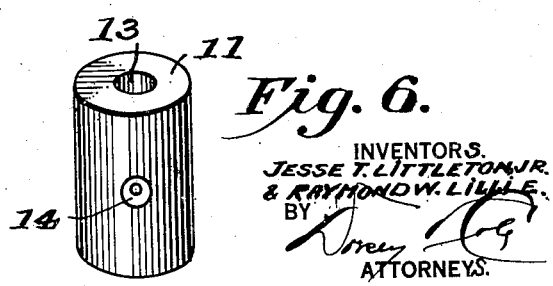
INVENTORS.
JESSE T. LITTLETON, JR.
& RAYMOND W. LILLIE.
BY
ATTORNEYS.

Patented June 2, 1931

1,808,047

UNITED STATES PATENT OFFICE

JESSE T. LITTLETON, JR., OF CORNING, AND RAYMOND W. LILLIE, OF NEW ROCHELLE, NEW YORK

METHOD OF MAKING BEARINGS

Application filed October 15, 1928. Serial No. 312,637.

This invention relates to bearings and the method of making them and more particularly to the production of composite bearings wherein a hard wear-resisting material such as glass is incorporated with a relatively soft, more or less pliant substance which may be machined to insure accurate centering of the bore of the bearing with relation to its exterior.

Heretofore attempts have been made to produce glass bearings but owing to the inability to accurately locate the bore in the center of the bearing the use of such bearings has not proven wholly satisfactory. Moreover, much difficulty has been experienced in preserving the accuracy of the bore due to the tendency of the material to distort during its formation.

An object of the present invention is to reduce to a minimum the expense and labor incident to the proper maintenance of bearings, such as those used for supporting the shafts of electric motors and to improve the wear-resisting qualities of such bearings.

Another object is to produce accurate bores in low expansion wear-resisting bodies and to secure accurate location of the bores relatively to the exterior of bearings in which they are incorporated.

Still another object is to secure a hard mechanical bearing surface and yet absorb the vibration which frequently accompanies the rotation of shafts in their bearings.

The above and other objects may be attained by practicing this invention which embodies among its features the production of a hard unyielding core, of wear-resisting material such as glass, having a low expansion coefficient and a smooth surfaced core of exact dimensions, the encasing of it in a relatively soft cushioning material, and the machining of the casing to accurately locate the bore with relation to the exterior of the bearing. A glass suitable for use in producing such a core is described and claimed in United States Letters Patent No. 1,304,623, granted to Sullivan and Taylor.

In the drawings;

Fig. 1 is a perspective view of a bearing constructed in accordance with this invention;

Fig. 2 is a horizontal sectional view through Fig. 1;

Fig. 3 is a longitudinal sectional view taken on the line 3—3 of Fig. 2;

Fig. 4 is a top plan view of a mold used in producing the wear-resisting core;

Fig. 5 is a longitudinal sectional view through the mold illustrated in Fig. 4;

Fig. 6 is a perspective view of a completed core; and

Fig. 7 is a longitudinal sectional view through a mold for shaping the yielding material around the core.

Referring to the accompanying drawings, our improved bearing, designated generally 10, consists of a wear-resisting core 11 and a casing 12, the former being provided with a bore 13 of the desired size. The bearing is preferably formed with an oil hole 14 which communicates at its inner end with the bore 13.

In producing the core 11 above referred to, we provide a mold designated generally 15 which consists of a bed plate 16 and a pair of hinged mold halves 17. The bed plate 16 is provided in its upper side with a tapered recess 18 which is surrounded by an annular upwardly extending flange 19 forming a depression 20 in which a platen 21 is received. Each mold half 17 is provided at its lower end with a recess 22 to receive the flange 19 and the platen 20 and is also formed with a mold cavity 23 which cooperates with the mold cavity of the opposite mold half to produce a mold chamber of the proper contour for the production of the core 11. Communicating with the chamber is a font 24 into which the molten glass from which the article is to be formed is introduced.

In order that the core 11 may be provided with a suitable longitudinal bore 13, a core pin 25 is seated in the tapered recess 18 with its upper end projected through an opening 26 in the platen 20 (Fig. 5). Formed in one of the mold halves is a radial opening 27 through which a radial core pin 28 extends, and the inner end of said pin is received in a radial recess formed in the core pin 25. In this way the core pin 28 is retained in position to form a radial opening in the core 11 during its production. In forming the core 11 molten glass is introduced into the font 24, whereupon a plunger 29 is lowered into the font to expel the glass from the font into the mold chamber. In order to prevent the checking of glass during the formation of the core 11, we have found it desirable to heat the core pins 25 and 28 prior to introducing them into the mold.

After pressing the core as above set forth the glass is removed from the mold and introduced into a suitable leer where it is annealed in the ordinary manner to relieve strains, the core pins 25 and 28 being left in place during the annealing and cooling of the core. After cooling removal of the core pins may be easily accomplished as they are made from a material possessing a relatively high coefficient of expansion while the expansion of the glass is relatively low. Hence on cooling, the core pins will shrink away from their respective cavities and may be readily withdrawn therefrom.

In order to provide the glass core with a yieldable outer casing 12 we provide a mold, designated generally 30 which consists of a bed plate 31 having an integral upstanding wall 32 of an internal contour, corresponding to the shape of the finished bearing. A longitudinally extending stud 33 is secured in the bed plate 31 and is adapted to enter the bore 13 of the core 11 to hold the latter in proper position in the mold 30. A radially extending core pin 34 is then introduced through a radial opening 35 formed in the wall 30 and its inner end is received in the radial bore 14 which was formed in the core 11 by the core pin 28. Supported on the upper end of the core 11 is a cap 36 which is preferably of slightly larger diameter than the core 11 and provided in its under side with a recess 37 for the reception of the upper end of the stud 33.

After assembling the core 11 in the mold 30, as above described, the material from which the casing 12 is to be made, such as phenol condensation products, is then introduced in powdered form, into the mold 30 around the core 11. A plunger 38, the outer contour of which corresponds to the internal configuration of the mold 30, is then introduced into the upper end of the mold to press the powdered material into compact form about the core, it being understood that this operation is carried on under the proper temperature and pressure conditions to convert the powdered substance into a solid.

When using certain phenol condensation products, I have found that a pressure of 3,000 pounds per square inch, at approximately 300° F. is sufficient for the purpose. After the pressing is completed the article is removed from the mold and machined to its proper external dimension.

It will be apparent that any inequalities in centering the bore 13 in the glass member 11 can be compensated for by a greater or lesser thickness in the portion of the casing member 12 which is in contact with that portion of the glass member 11, thus making it possible to produce a finished bearing 10 provided with a bore 13 that is disposed exactly centrally with respect thereto.

Owing to the smoothness which is characteristic of a finished glass surface, and the hardness of the glass, there will be very little friction between a bearing of the type embodying our invention and the shaft with which it is used. Consequently but very little heat will be developed and little or no lubrication will be required. Moreover, the period of service of such lubricants as may be used will be considerably extended. In order that lubrication may be supplied, the bearing is provided with the bore 14 forming an oil hole, and by means of any well known oil feeding device, sufficient oil can be automatically supplied to the bearings to provide proper lubrication for a considerable period without attention.

Inasmuch as phenol condensation products have a considerably greater expansion than glass of the type indicated above, the material which forms the casing 12 will contract on setting and tightly grip the core 11. However, if desired, the latter may be provided with projecting lugs or fins which become embedded in the casing 12 during the formation of the latter, so as to provide anchors which will prevent any relative displacement of the parts.

While we do not desire to be limited thereto, we have found that glass of the type set forth above is the most satisfactory material from which to produce the core 11, and that phenol condensation products are the most satisfactory materials for the outer casing. It will be obvious, however, that the component parts may be produced from other materials possessing the requisite properties.

From the foregoing it will be apparent that we have not only devised a new and improved bearing which, when used in a machine, is comparable to the jewel in a watch, but have also devised a new method of forming bearings. It will be obvious that these bearings and the method of making them may be varied in many ways, and we do not desire to be limited to the particular disclosure set forth herein, except as indicated by the scope of the following claims.

We claim:

1. The method of making bearings which consists in forming a glass core with a shaft-receiving bore, placing said core in a mold, surrounding the core with finely comminuted material and heating and exerting pressure on the finely comminuted material to form a solid casing around the core, and cooling to cause a contraction of said casing on said core.

2. The method of making bearings which consists in forming a glass core with a shaft-receiving bore, placing said core in a mold, surrounding the core with finely comminuted material, and heating and exerting pressure on the finely comminuted material to form a solid casing around the core and cooling to cause a contraction of said casing on said core, and machining said casing to center said bore.

3. The method of making bearings which consists in forming from glass of expansion coefficient not greater than .0000040 a core with a shaft-receiving bore, placing said core in a mold, surrounding the core with finely comminuted material and heating and exerting pressure on the finely comminuted material to form a solid casing around the core and cooling to cause a contraction of said casing on said core, and machining said casing to center said bore.

4. The method of making bearings which consists in forming a glass core with a shaft-receiving bore, placing said core in a mold, surrounding the core with a powdered phenol condensation product and heating and exerting pressure on the powdered phenol condensation product to form a solid casing around the core and cooling to cause a contraction of said casing on said core.

5. The method of making bearings which consists in forming a glass core with a shaft-receiving bore, placing said core in a mold, surrounding the core with a powdered phenol condensation product and heating and exerting pressure on the powdered phenol condensation product to form a solid casing around the core and cooling to cause a contraction of said casing on said core, and machining said casing to center said bore.

6. The method of making bearings which consists in forming from glass of expansion coefficient not greater than .0000040 a core with a shaft-receiving bore, placing said core in a mold, surrounding the core with a powdered phenol condensation product and heating and exerting pressure on the powdered phenol condensation product to form a solid casing around the core and cooling to cause a contraction of said casing on said core, and machining said casing to center said bore.

JESSE T. LITTLETON, Jr.
RAYMOND W. LILLIE.